(12) United States Patent
Furuki et al.

(10) Patent No.: US 8,149,487 B2
(45) Date of Patent: Apr. 3, 2012

(54) OPTICAL APPARATUS

(75) Inventors: Makoto Furuki, Minamiashigara (JP); Kazuhiro Hayashi, Minamiashigara (JP); Jiro Minabe, Minamiashigara (JP); Katsunori Kawano, Minamiashigara (JP); Yasuhiro Ogasawara, Minamiashigara (JP); Shin Yasuda, Minamiashigara (JP); Koichi Haga, Ebina (JP); Hisae Yoshizawa, Kanagawa (JP)

(73) Assignee: Fuji Xerox Co., Ltd, Tokyo (JP)

( * ) Notice: Subject to any disclaimer, the term of this patent is extended or adjusted under 35 U.S.C. 154(b) by 834 days.

(21) Appl. No.: 12/052,784

(22) Filed: Mar. 21, 2008

(65) Prior Publication Data
US 2009/0059330 A1 Mar. 5, 2009

(30) Foreign Application Priority Data
Aug. 27, 2007 (JP) ................... 2007-219587

(51) Int. Cl.
*G03H 1/00* (2006.01)
(52) U.S. Cl. ...................................... 359/30; 359/211.5

(58) Field of Classification Search .................... 359/30, 359/35, 209.1, 211.5, 837, 25, 31; 369/103, 369/112.01
See application file for complete search history.

(56) References Cited

U.S. PATENT DOCUMENTS

| | | | |
|---|---|---|---|
| 5,270,842 A * | 12/1993 | Clay et al. ........................ | 359/12 |
| 5,497,254 A * | 3/1996 | Amako et al. .................. | 349/74 |
| 7,283,286 B2 * | 10/2007 | Fukumoto et al. .............. | 359/10 |
| 7,333,253 B2 * | 2/2008 | Kuroda et al. .................. | 359/24 |
| 7,339,711 B2 * | 3/2008 | Kuroda et al. .................. | 359/24 |
| 2007/0139777 A1 * | 6/2007 | Williams et al. .............. | 359/565 |
| 2007/0253042 A1 * | 11/2007 | Szarvas et al. .................. | 359/22 |

FOREIGN PATENT DOCUMENTS
JP 2003-178458 A 6/2003
WO WO 2004102541 A1 * 11/2004

* cited by examiner

*Primary Examiner* — Frank G Font
(74) *Attorney, Agent, or Firm* — Sughrue Mion, PLLC

(57) ABSTRACT

An optical apparatus includes: a focusing lens that focuses light which is one of recording light being irradiated to an optical recording medium with reference light for recording a hologram and reference light being irradiated to an optical recording medium for reading out a hologram; and a focal position-shifting unit that refracts the light while moving in accordance with a moving speed of the optical recording medium, so as to shift a focal position of the light in the optical recording medium a distance in a thickness direction of the optical recording medium.

7 Claims, 5 Drawing Sheets

OPTICAL APPARATUS

CROSS-REFERENCE TO RELATED APPLICATION

This application is based on and claims priority under 35 USC §119 from Japanese Patent Application No. 2007-219587 filed Aug. 27, 2007.

BACKGROUND (i) Technical Field

This invention relates to an optical apparatus.

(ii) Related Art

A hologram recording and reproducing apparatus records and reproduces digital data by means of recording and reproducing, as a hologram, signal light in which binary digital data "0 and 1" etc., is digitally imaged as, for example, "bright and dark". In the case of a Fourier transform hologram, signal light is subjected to Fourier transform by means of a lens and the Fourier-transformed light is irradiated to an optical recording medium together with reference light interfering with the recording light to generate an interference fringe, and the generated interference fringe is recorded in the optical recording medium as a hologram. To reproduce data, reference light is irradiated to the optical recording medium, diffracted light is received at a photo detector, and a digital image is reproduced to obtain digital data.

To enhance the recording capacity of an optical recording medium, a method of multiply recording a hologram in the thickness direction of the optical recording medium has been proposed. In this case, it is necessary to shift the focal position of recording light and reference light at high speed and precisely in the thickness direction of the optical recording medium.

SUMMARY

According to an aspect of the invention, there is provided an optical apparatus including:
 a focus lens that focuses light which is one of recording light being irradiated to an optical recording medium for recording a hologram and reference light being irradiated to an optical recording medium for reproducing (reading out) a hologram; and
 a focal position-shifting unit that refracts the light while moving in accordance with a moving speed of the optical recording medium, so as to shift a focal position of the light in the optical recording medium a distance in a thickness direction of the optical recording medium.

BRIEF DESCRIPTION OF THE DRAWINGS

Embodiments of the present invention will be described in detail based on the following figures, wherein.

DETAILED DESCRIPTION

An exemplary embodiment will be discussed with reference to the accompanying drawings.

Figure 1:
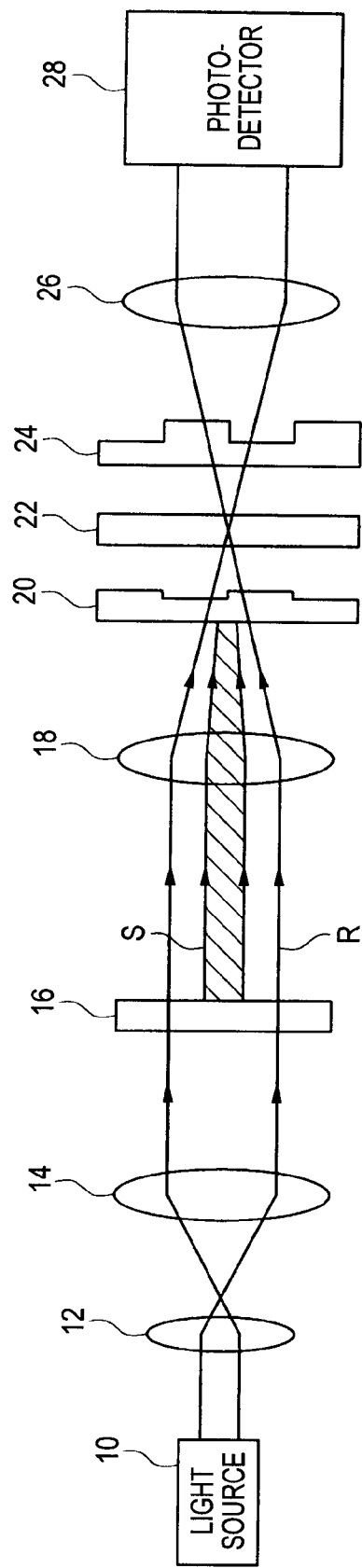
FIG. 1 shows a hologram recording and reproducing apparatus including an optical apparatus according to an exemplary embodiment of the invention.

FIG. 1 shows a hologram recording and reproducing apparatus including an optical apparatus according to an exemplary embodiment of the invention. In FIG. 1, to record signal light as a hologram, coherent light from a light source 10 is converted into collimated light having a wide diameter by means of lenses 12 and 14, and the collimated light is made incident on a spatial light modulator 16.

The spatial light modulator 16 include a liquid crystal panel for example and produces a digital image (binary image; however, not limited thereto) in which binary digital data "0 and 1" is taken as "bright and dark" by means of a computer (not shown). Accordingly, the light passed through the spatial light modulator 16 is intensity-modulated in accordance with the value of each pixel of the binary image to produce signal light S. The signal light S is Fourier-transformed (focused) through a Fourier transform lens 18 and is irradiated to an optical recording medium 22 through a focal position-shifting plate 20.

Reference light R is made to have a common optical axis to the signal light S and is irradiated to the optical recording medium 22 from the outside of the signal light S. As the reference light R, coherent light from the light source 10 is converted into collimated light by means of the lenses 12 and 14 and the collimated light is made incident on the outer peripheral area of the spatial light modulator 16. The reference light R passed through the outer peripheral area of the spatial light modulator 16 is irradiated to the optical recording medium 22 through the Fourier transform lens 18 and the focal position-shifting plate 20 like as in the signal light S.

As a result of the above process, the signal light S and the reference light R after Fourier-transformed interfere with each other in the optical recording medium 22 and the signal light S is recorded in the optical recording medium 22 as a hologram.

The spatial light modulator 16 is described as transmission type, but can also be of reflection type. The reference light R is not limited to the above case in which it passes through the outer peripheral area of the spatial light modulator 16. For example, the reference light R may be passed through a different optical path from the signal light S by using an appropriate beam splitter, an appropriate reflecting mirror and the like, to have the optical axis common to the signal light S at the stage at which the reference light R is incident on the Fourier transform lens 18.

The focal position-shifting plate 20 is adapted to shift the focal position of recording light (the signal light S and the reference light R at the recording time) and the reference light R (at the reproducing time) to be irradiated to the optical recording medium 22 a distance in the thickness direction of the optical recording medium 22. The focal position-shifting plate 20 is described later.

Next, in FIG. 1, to reproduce information from diffracted light of a hologram, coherent light from the light source 10 is converted into collimated light having a wide diameter by means of the lenses 12 and 14, and only reference light R is allowed to be incident on the Fourier transform lens 18 through the spatial light modulator 16 and is irradiated to the optical recording medium 22 while the light focal position is adjusted with the focal position-shifting plate 20. The thus-generated diffracted light from the hologram passes through an optical path length-compensation plate 24 and is converted into collimated light through an inverse Fourier transform lens 26 and the collimated light is received by an appropriate photo detector 28 to obtain information contained in the hologram.

Since the image forming position at the time of the reproducing shifts a distance as long as the shifting length of the light focal position by the focal position-shifting plate 20, the image detected by the photo detector 28 blurs. Then, the light path length is compensated by the optical path length-compensation plate 24 to avoid the blur of the image. The optical path length-compensation plate 24 is described later.

Figure 2A:
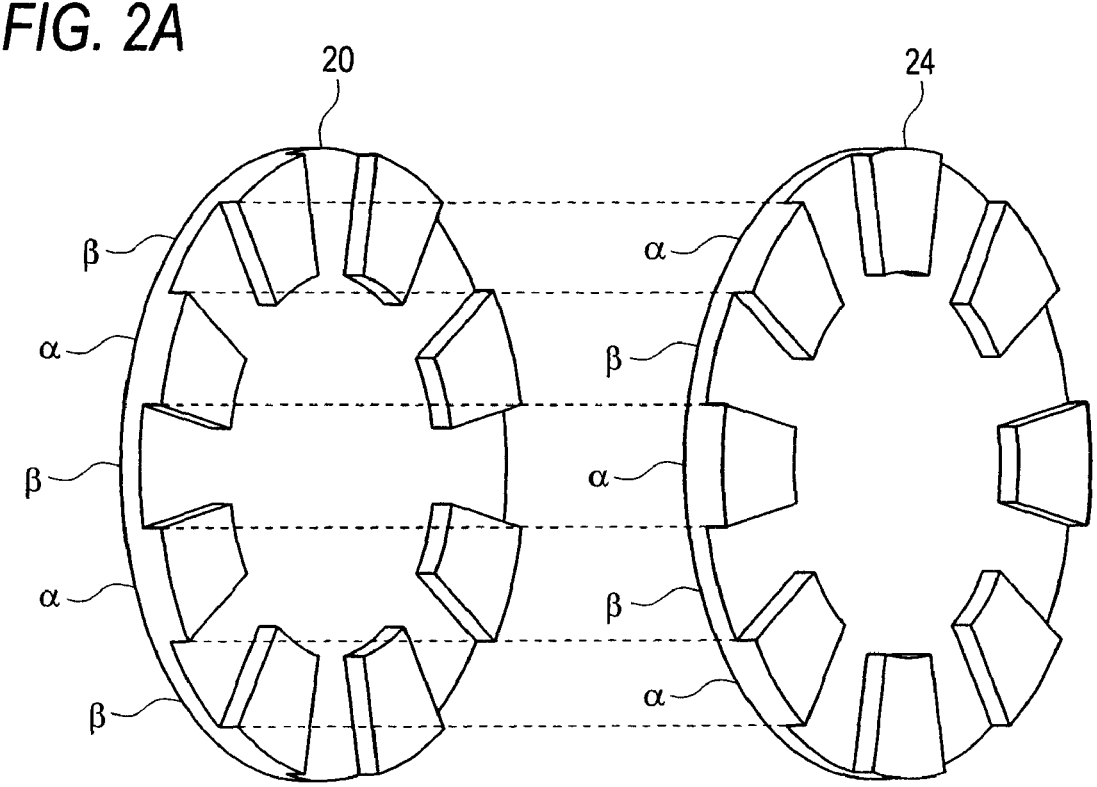
FIG. 2 shows a focal position-shifting plate and an optical path length-compensation plate.
Figure 2B:
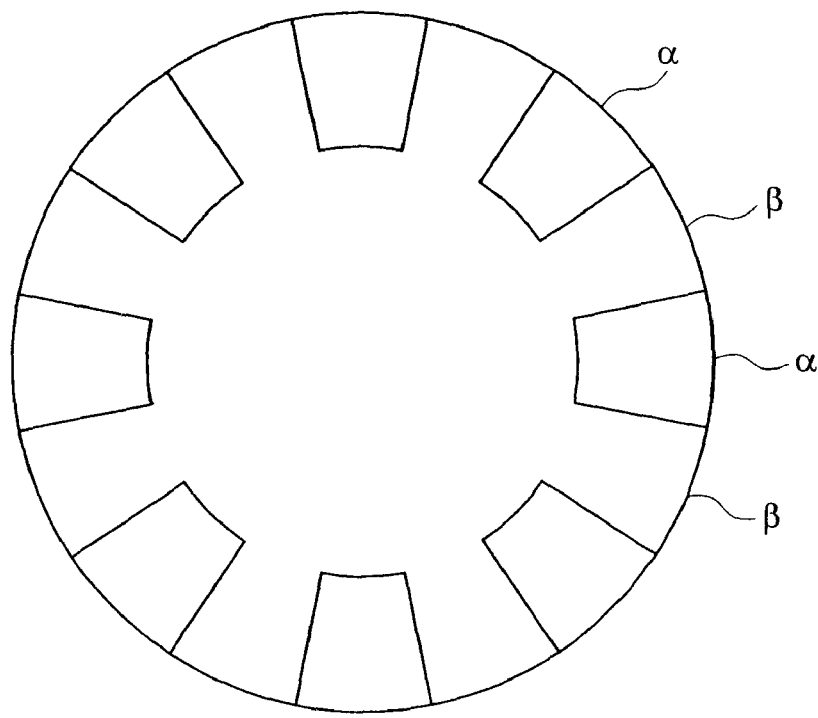

FIGS. 2A and 2B show illustrative configurations of the focal position-shifting plate 20 and the optical path length-compensation plate 24. The focal position-shifting plate 20 and the optical path length-compensation plate 24 each is formed of an optically transparent material such as glass, transparent resin, etc. In FIG. 2A, the optical recording medium 22 existing between the focal position-shifting plate 20 and the optical path length-compensation plate 24 is not shown. FIG. 2B is a plan view of the focal position-shifting plate 20 and the optical path length-compensation plate 24.

In FIG. 2A, the focal position-shifting plate 20 and the optical path length-compensation plate 24 each is formed like a disk. Planes orthogonal to the optical axis of recording light or reference light are formed on the circumference of each of the focal position-shifting plate 20 and the optical path length-compensation plate 24, and the planes are divided areas whose thicknesses in the optical axis direction are periodically different. In an embodiment op FIG. 2A, two kinds of thickness are provided so that an alternating pattern of a raised plane α and a recess plane β is formed on the periphery of the disk, but the embodiment is not limited thereto. Three or more kinds of areas different in the thickness may be formed in accordance with a multiple recording in the thickness direction of the optical recording medium 22.

In each of the focal position-shifting plate 20 and the optical path length-compensation plate 24 according to the embodiment of FIG. 2A, portions of the raised planes α have the same thickness in a direction of the optical axis and also portions of the recess planes β have the same thickness in the direction of the optical axis. As shown in FIG. 2B, the raised planes α formed on the focal position-shifting plate 20 and the optical path length-compensation plate 24 are formed as the same plane shape, and the recess planes β are also formed as the same plane shape. The raised plane α and the recess plane β are planes of the same size. Further, the focal position-shifting plate 20 and the optical path length-compensation plate 24 are placed so that light passed through the raised plane α of the focal position-shifting plate 20 passes through the recess plane β of the optical path length-compensation plate 24 downstream of the optical path, and light passed through the recess plane β of the focal position-shifting plate 20 passes through the raised plane α of the optical path length-compensation plate 24 downstream of the optical path, as indicated by the dashed lines in FIG. 2A. In this state, the focal position-shifting plate 20 and the optical path length-compensation plate 24 rotate at the same speed in the same direction. Consequently, the light passed through the focal position-shifting plate 20 and the optical path length-compensation plate 24 always travels the same distance through the optically transparent material such as glass. Accordingly, blurring of the image detected by the photo detector 28 can be avoided.

The thickness difference between the raised plane α and the recess plane β can be determined by the fluctuation amount of the necessary focal length (focal position) and the value of the thickness difference can be obtained by a calculation expression described later. The Fourier transform lens 18 and the inverse Fourier transform lens 26 should be designed so as to lessen the effect of aberration caused by the sum of the thicknesses of the focal position-shifting plate 20 and the optical path length-compensation plate 24, which is a constant.

Figure 3A:
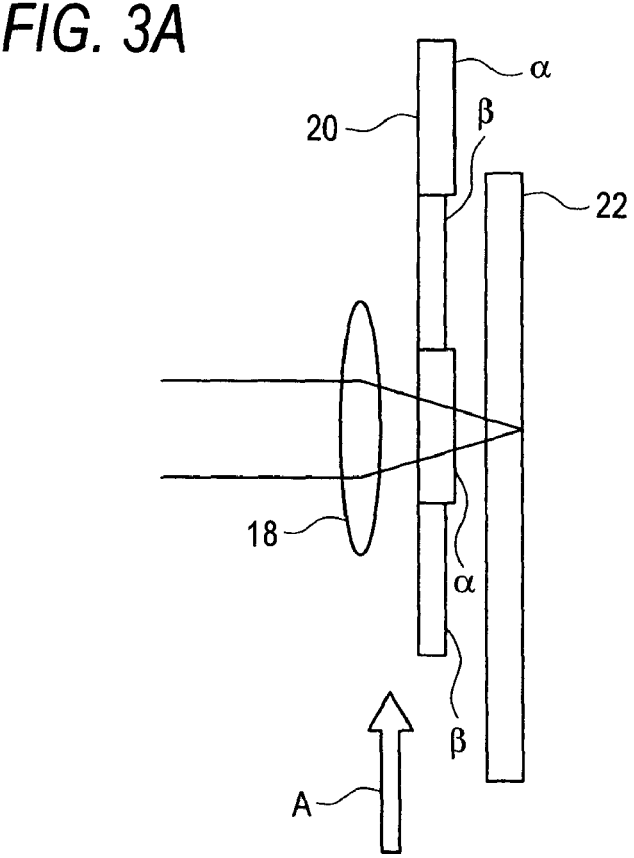
FIG. 3 is a schematic drawing of the light focal position-shifting function of the focal position-shifting plate.
Figure 3B:
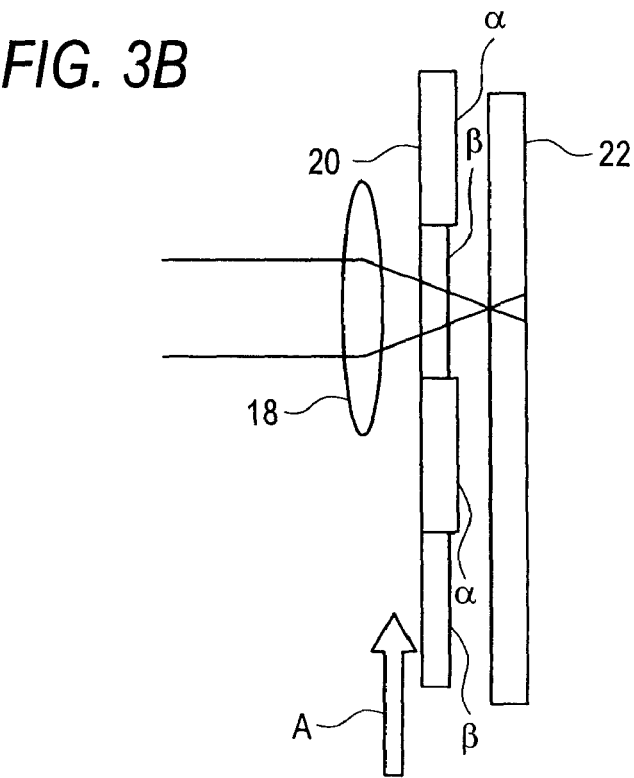

FIGS. 3A and 3B are schematic drawings of the light focal position-shifting function of the focal position-shifting plate 20. In FIGS. 3A and 3B, the focal position-shifting plate 20 has the raised planes α and the recess planes β described above in the periphery portion. The focal position-shifting plate 20 rotates in the arrow A direction at a speed so that the raised planes α and the recess planes β through which recording light or reference light passes change in accordance with the moving speed of the optical recording medium 22. The rotation speed of the focal position-shifting plate 20 is determined by the moving speed of the optical recording medium 22, the surface concentration of information multiple-recorded in the optical recording medium 22, the length (pitch) in the arrow A direction of the raised planes α and the recess planes β, and the like. It is not desirable to irradiate light so that recording light and reference light are put on the steps between the raised plane α and the recess plane β in each of the focal position-shifting plate 20 and the optical path length-compensation plate 24. It is desirable that control should be performed so that a laser is on only when the optical path passes through the flat portions of the raised plane α and the recess plane β. Thus, it is desirable that the beam spot on the surfaces of the steps should be small as much as possible and that the corresponding planes of the focal position-shifting plate 20 and the optical path length-compensation plate 24 face to the optical recording medium 22 and are placed at an equal distance from the optical recording medium 22.

As shown in FIGS. 3A and 3B, when emission light from the Fourier transform lens 18 is incident on the raised plane α or the recess plane β of the focal position-shifting plate 20, the light focal position changes in the thickness direction of the optical recording medium 22 because of refraction of light. For example, if light passes through the raised plane α, the light focal position becomes the back of the optical recording medium 22, namely, a distant position from the incidence surface of the optical recording medium 22, and if light passes through the recess plane β, the light focal position becomes the front of the optical recording medium 22, namely, a near position to the incidence surface of the optical recording medium 22.

Figure 4:
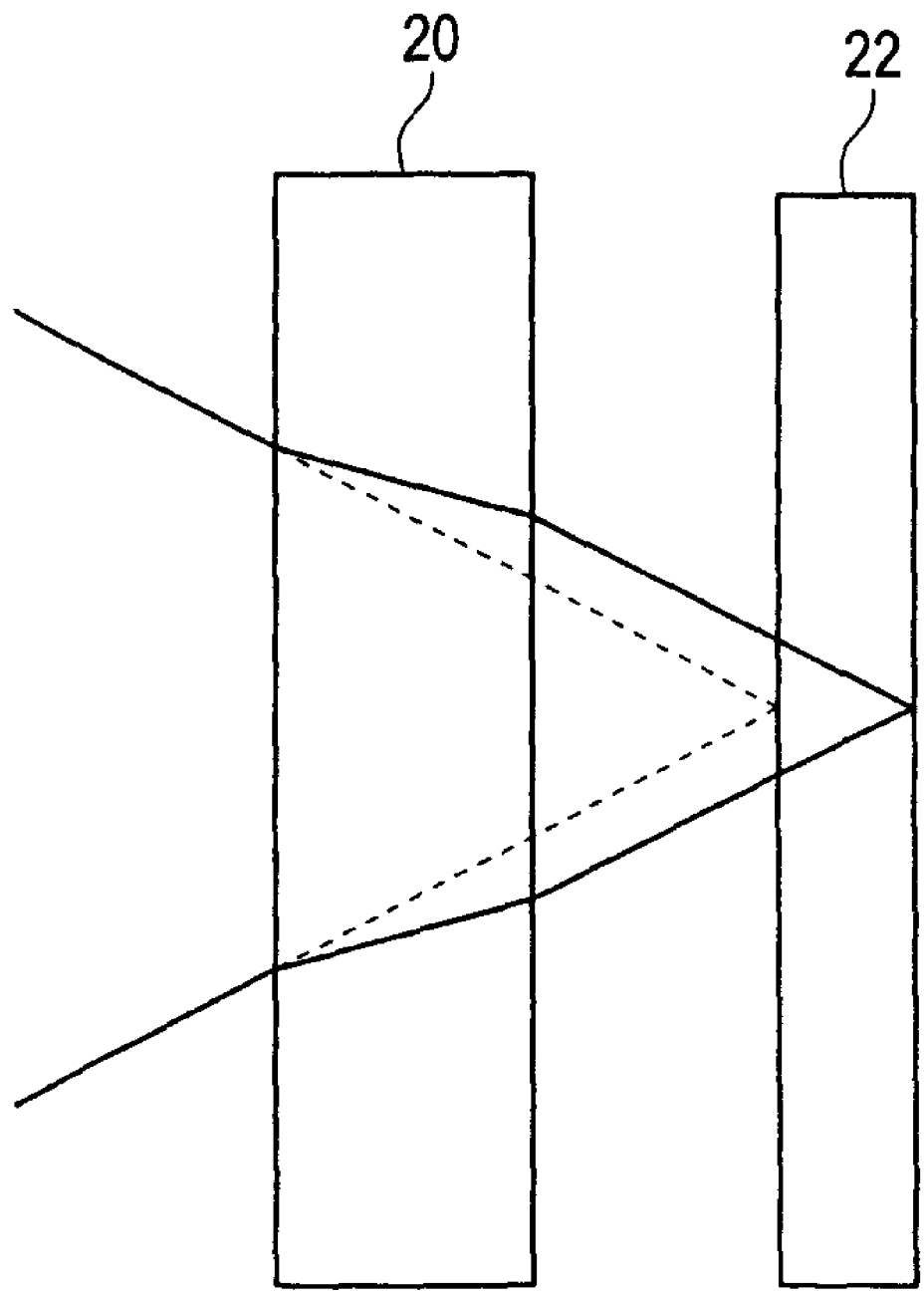
FIG. 4 is a schematic drawing of a principle of shifting a light focal position.

FIG. 4 is a schematic drawing of a principle of shifting the light focal position. In FIG. 4, emission light from the Fourier transform lens 18 passes through the focal position-shifting plate 20 and is focused at a position of the optical recording medium 22. When light passes through the focal position-shifting plate 20, because of refraction of light, the light focal position shifts to the back of the optical recording medium 22 from the light focal position applied when the focal position-shifting plate 20 does not exist (indicated by the dashed line). Thus, the thickness of the focal position-shifting plate 20 is appropriately adjusted, whereby the light focal position can be controlled to a plurality of positions (two positions in FIGS. 3A and 3B) in the thickness direction of the optical recording medium 22 as shown in FIGS. 3A and 3B.

Figure 5A:
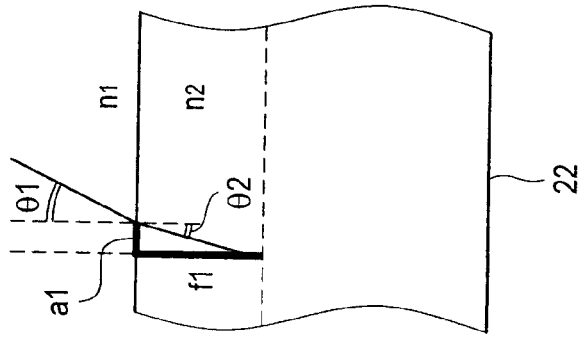
FIG. 5 shows an explanation drawing for calculating the shifting distance of the light focal position.
Figure 5B:
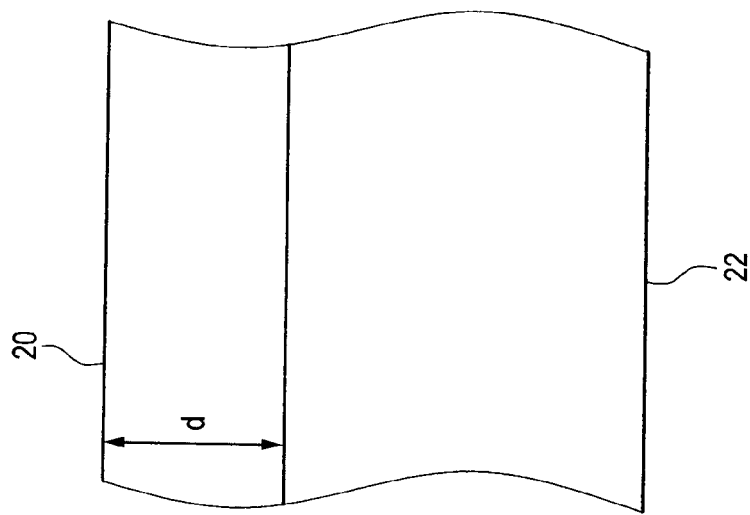
Figure 5C:
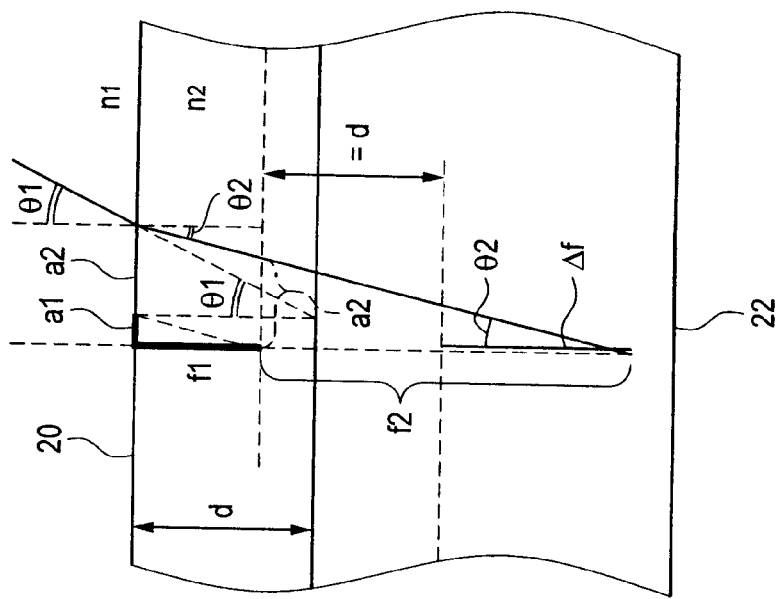

FIGS. 5A, 5B, and 5C are drawings for calculation of the shifting distance of the light focal position. In FIG. 5A, when the focal position-shifting plate 20 does not exist, emission light of the Fourier transform lens 18 is incident on the optical recording medium 22 at an incidence angle $\Theta 1$, propagates through the optical recording medium 22 at a refraction angle (angle relative to the normal raised on the incidence surface) $\Theta 2$, and is focused at a position of distance f1 from the incidence surface. At this time, it is assumed that shift between the incidence position and the light focal position in the direction along the incidence surface is n1. It is also assumed that the refractive index of air is n1 (=1) and that of the optical recording medium 22 is n2.

Next, in FIG. 5B, the case where the focal position-shifting plate 20 having thickness displaced between the Fourier transform lens 18 and the optical recording medium 22 is considered. However, for convenience of calculation, it is assumed that the focal position-shifting plate 20 and the optical recording medium 22 are placed in intimate contact with each other and the refractive indexes of the focal position-shifting plate 20 and the optical recording medium 22 are the same value (n2). In this case, emission light from the Fourier transform lens 18 is refracted on the incidence face of the focal position-shifting plate 20 and propagates through the focal position-shifting plate 20 and the optical recording medium 22 at the refraction angle Θ2 as shown in FIG. 5C.

Assuming that shift between the incidence position on the incidence surface of the optical recording medium 22 when the focal position-shifting plate 20 does not exist and the incidence position on the focal position-shifting plate 20 in the direction of the incidence surface is a2, if the focal position-shifting plate 20 having thickness d is placed, the incidence position shifts a1+a2 in the direction of the incidence surface relative to the light focal position. Assuming that light is not refracted on the incidence surface of the focal position-shifting plate 20, light arrives at the emission surface of the focal position-shifting plate 20 at a position of shift a2 in the direction of the incidence surface from the incidence position.

The relationship between each angle and length in FIG. 5C is arranged to:

$$a1 = f1 \times \tan\Theta 2$$

$$a2 = d \times \tan\Theta 1$$

When the distance between the emission surface of the focal position-shifting plate 20 and the light focal position is f2, $$f2 = a2/\tan\Theta 2 = d \times (\tan\Theta 1/\tan\Theta 2)$$

$$\Delta f = f2 - d = d \times (\tan\Theta 1/\tan\Theta 2) - d$$

$$= d \times \{(\tan\Theta 1 - \tan\Theta 2)/\tan\Theta 2\}$$

When the numerical aperture of the Fourier transform lens 18 us NA, $$\Theta 1 = \arcsin NA, \ \Theta 2 = \arcsin NA/n2$$

Therefore, $$\Delta f = d \times \{\tan(\arcsin NA) - \tan(\arcsin NA/n2)\}/\{\tan(\arcsin NA/n1)\}$$

The invention can be applied without departing from the scope of the description. For example, in the Specification, the depth of the light focal position is changed at two positions using two surfaces of raised plane α and recess plane β, but the number can be adjusted as required. The raised planes α and the recess planes β are arranged like a disk and are rotated in the perpendicular direction to the optical axis of the recording light or the reference light, but the invention is not limited thereto. Any moving of the planes can be made in accordance with the moving speed of the optical recording medium 22.

What is claimed is:

1. An optical reading apparatus comprising:
   a focusing lens configured to focus reference light being irradiated along an optical axis to an optical medium so as to read out a recorded hologram; and
   a focal position-shifting unit configured to refract the reference light while moving in accordance with a moving speed of the optical medium, so as to shift a focal position of the reference light in the optical medium in a thickness direction of the optical medium,
   wherein the focal position-shifting unit comprises step portions, each one of the step portions being disposed between flat portions of the focal position-shifting unit,
   wherein the reference light is irradiated when the optical axis passes through the flat portions, and
   wherein the reference light is not irradiated when the optical axis passes through the step portions.

2. The optical reading apparatus according to claim 1, wherein the focal position-shifting unit periodically shifts the focal position in the thickness direction of the optical medium.

3. The optical reading apparatus according to claim 1, wherein the focal position-shifting unit has a plane orthogonal to the optical axis of the reference light incident on the focal position-shifting unit, and
   wherein the plane is divided into areas having periodically different positions in a direction of the optical axis.

4. The optical reading apparatus according to claim 1, further comprising a compensation unit that moves in accordance with a moving speed of the focal position-shifting unit so as to compensate for an optical path length of the reference light.

5. The optical reading apparatus according to claim 4, wherein each of the focal position-shifting unit and the compensation unit has a shape of a disk having an alternating pattern of a first plane and a second plane on a periphery of the disk, a portion having the first plane having a thickness different from that of a portion having the second plane, and
   wherein the focal position-shifting unit and the compensation unit rotate so that light passing through the first plane in the focal position-shifting unit passes through the second plane in the compensation unit and light passing through the second plane in the focal position-shifting unit passes through the first plane in the compensation unit.

6. The optical reading apparatus according to claim 1, wherein the focal position-shifting unit includes a plurality of position-shifting members arranged along a circumferential direction of the focal position-shifting unit at even intervals.

7. An optical recording apparatus comprising:
   a focusing lens configured to focus recording light being irradiated along an optical axis to an optical medium so as to record a hologram on the optical medium; and
   a focal position-shifting unit configured to refract the recording light while moving in accordance with a moving speed of the optical medium, so as to shift a focal position of the recording light in the optical medium in a thickness direction of the optical medium,
   wherein the focal position-shifting unit comprises step portions, each one of the step portions being disposed between flat portions of the focal position-shifting unit,
   wherein the recording light is irradiated when the optical axis passes through the flat portions, and
   wherein the recording light is not irradiated when the optical axis passes through the step portions.

* * * * *